(12) United States Patent
Meguriya et al.

(10) Patent No.: US 6,841,596 B2
(45) Date of Patent: Jan. 11, 2005

(54) RELEASE AGENT FOR SILICONE RUBBER MOLDING MOLDS AND MOLDING METHOD

(75) Inventors: Noriyuki Meguriya, Gunma-ken (JP); Syuuichi Azechi, Gunma-ken (JP); Naoki Yamakawa, Gunma-ken (JP); Makoto Kusama, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/647,481

(22) Filed: Aug. 26, 2003

(65) Prior Publication Data

US 2004/0039111 A1 Feb. 26, 2004

(30) Foreign Application Priority Data

Aug. 26, 2002 (JP) ........................................ 2002-244656

(51) Int. Cl.[7] ............................................... C08G 77/26
(52) U.S. Cl. .................... 524/38; 524/588; 106/287.11; 528/42
(58) Field of Search .............. 524/38, 588; 106/287.11; 528/42

(56) References Cited

U.S. PATENT DOCUMENTS

| | | |
|---|---|---|
| 4,547,544 A | 10/1985 | Allardice |
| 4,678,688 A | 7/1987 | Itoh et al. |
| 2002/0105728 A1 | 8/2002 | Yamaguchi et al. |

FOREIGN PATENT DOCUMENTS

| | | |
|---|---|---|
| JP | 62-173220 A | 7/1987 |
| JP | 63-60071 B2 | 11/1988 |
| JP | 2-9069 B2 | 2/1990 |
| JP | 2-49082 A | 2/1990 |
| JP | 3-11248 B2 | 2/1991 |
| JP | 04-314771 A | 11/1992 |
| JP | 6-86584 B2 | 11/1994 |

*Primary Examiner*—Kuo-Liang Peng
(74) *Attorney, Agent, or Firm*—Birch, Stewart, Kolasch & Birch, LLP

(57) ABSTRACT

A release agent comprising a perfluoroalkyl ether silazane polymer or a perfluoroalkyl or perfluoroalkyl ether silazane/alkylsilazane copolymer and an organic solvent is suitable for use in molds for silicone base rubber molding. The agent offers effective, long-lasting release properties and ease of molding.

12 Claims, No Drawings

RELEASE AGENT FOR SILICONE RUBBER MOLDING MOLDS AND MOLDING METHOD

This invention relates to a release agent for use in molds for silicone base rubber molding, and a method of molding silicone base rubber parts using the same. More particularly, it relates to a release agent which exhibits effective, long-lasting release properties in the molding of silicone base rubber, and a method of molding silicone base rubber parts using the same.

BACKGROUND OF THE INVENTION

In molding plastic and rubber materials in molds, release agents are often applied to the internal surface of molds in order to facilitate removal of molded parts from the molds. Typical release agents include metallic soap solutions, silicone-based release agents, tetrafluoroethylene resins and the like. Although metallic soaps, silicone oil and silicone grease exhibit good release properties, these release agents migrate to molded parts. As a result, the surface of molded parts becomes repellent, losing their abilities of uniform coating and subsequent fabrication. The lack of retention requires that the release agent be applied every several shots. On the other hand, the tetrafluoroethylene resins are satisfactory in the retention of release properties and the readiness of molded parts for subsequent fabrication. However, the step of forming a tetrafluoroethylene coating on the mold surface involves high-temperature baking and requires a skill. The use of tetrafluoroethylene resins is thus inadequate as the general mold release treatment.

A number of film-forming silicones are known as disclosed in JP-B 63-060071, JP-B 3-11248 and JP-B 2-9069, all corresponding to U.S. Pat. No. 4,678,688. Cured films of these silicones exhibit insufficient release properties, especially when silicone rubber of the heat-cure type is molded at 180–200° C. and removed. Polymers of perfluoroalkyl silazanes are also known as disclosed in JP-A 2-49082 corresponding to U.S. Pat. No. 4,678,688. Polysilazane films also have unsatisfactory release effects and lack durability because they become hard and brittle.

SUMMARY OF THE INVENTION

An object of the invention is to provide a release agent which exhibits effective, long-lasting release properties in the molding of silicone base rubber in a mold, and a method of molding silicone base rubber parts using the same.

We have found that a release agent comprising an organosilazane polymer comprising units of formula (1), shown below, or an organosilazane copolymer comprising units of formulae (2) and (3), shown below, and an organic solvent as essential components exhibits effective, long-lasting release properties when applied to molds where silicone base rubber is molded.

We already discovered that an effective water/oil repellent film is obtained using a perfluoroalkyl or perfluoroalkyl ether polysilazane in combination with an alkylpolysilazane as disclosed in JP-B 6-86584. Continuing research, we have found that by using a copolymer of a perfluoroalkyl or perfluoroalkyl ether silazane and an alkylsilazane or a polymer of perfluoroalkyl ether silazane as an active component and dissolving it in an organic solvent, there is obtained a release agent which exhibits and retains effective release properties when applied to molds for plastic and rubber materials, especially silicone base rubber materials. In addition, this release agent ensures ease of molding operation.

In a first aspect, the invention provides a release agent for use in molds for silicone base rubber molding, comprising as essential components, an organosilazane polymer comprising units represented by the general unit formula (1):

$$(R^1Q)_a R^2_b Si(NR^3)_{(4-a-b)/2} \quad (1)$$

wherein $R^1$ is independently a perfluoroalkyl ether group, $R^2$ and $R^3$ are each independently hydrogen or a substituted or unsubstituted monovalent hydrocarbon group, Q is independently a divalent organic group, "a" is an integer of 1 to 3, "b" is an integer of 0 to 2, and the sum of a+b is an integer of 1 to 3, and an organic solvent capable of dissolving the polymer.

In a second aspect, the invention provides a release agent for use in molds for silicone base rubber molding, comprising as essential components, an organosilazane copolymer comprising units represented by the general unit formula (2):

$$(R^4Q)_a R^2_b Si(NR^3)_{(4-a-b)/2} \quad (2)$$

wherein $R^4$ is independently a perfluoroalkyl or perfluoroalkyl ether group, $R^2$ and $R^3$ are each independently hydrogen or a substituted or unsubstituted monovalent hydrocarbon group, Q is independently a divalent organic group, "a" is an integer of 1 to 3, "b" is an integer of 0 to 2, and the sum of a+b is an integer of 1 to 3, and units represented by the general unit formula (3):

$$R^2_c Si(NR^3)_{(4-c)/2} \quad (3)$$

wherein $R^2$ and $R^3$ are as defined above, and "c" is an integer of 1 to 3, in a molar ratio of units (2)/units (3) between 95/5 and 50/50, and an organic solvent capable of dissolving the polymer.

In a third aspect of the invention, a silicone base rubber article is produced by molding a silicone base rubber in a mold which has been treated with the release agent of the first or second aspect.

DESCRIPTION OF THE PREFERRED EMBODIMENTS

In the release agent of the invention, the base polymer component is an organosilazane polymer comprising units represented by the general unit formula (1) or an organosilazane copolymer comprising units represented by the general unit formulae (2) and (3). The preferred base polymer is an organosilazane polymer consisting essentially of units represented by formula (1) or an organosilazane copolymer consisting essentially of units represented by formulae (2) and (3).

$$(R^1Q)_a R^2_b Si(NR^3)_{(4-a-b)/2} \quad (1)$$

$$(R^4Q)_a R^2_b Si(NR^3)_{(4-a-b)/2} \quad (2)$$

$$R^2_c Si(NR^3)_{(4-c)/2} \quad (3)$$

In the formulae, $R^1$ which may be the same or different is a perfluoroalkyl ether group, $R^2$ and $R^3$ which may be the same or different are hydrogen or a substituted or unsubstituted monovalent hydrocarbon group, $R^4$ which may be the same or different is a perfluoroalkyl or perfluoroalkyl ether group, Q which may be the same or different is a divalent organic group, "a" is an integer of 1 to 3, "b" is an integer of 0 to 2, and the sum of a+b is an integer of 1 to 3, and "c" is an integer of 1 to 3.

More particularly, in formula (1), $R^1$ is each independently selected from perfluoroalkyl ether groups. Preferred perfluoroalkyl ether groups have 2 to 35 carbon atoms and are represented, for example, by the general formula:

F—[CF(CF$_3$)CF$_2$O]$_e$CF(CF$_3$)— wherein e is an integer of 1 to 10. More preferred are perfluoroalkyl ether groups having 3 to 32 carbon atoms, especially 5 to 20 carbon atoms.

In formula (2), R$^4$ is each independently selected from perfluoroalkyl and perfluoroalkyl ether groups. The perfluoroalkyl groups are preferably straight or branched groups of 1 to 20 carbon atoms as represented by the formula: C$_m$F$_{2m+1}$— wherein m is an integer of 1 to 20, especially F(CF$_2$)$_m$— wherein m is an integer of 1 to 20. Inter alia, perfluoroalkyl groups of 4 to 10 carbon atoms are preferred, with a typical example being C$_8$F$_{17}$—. The perfluoroalkyl ether groups represented by R$^4$ are as exemplified for R$^1$ in formula (1).

R$^2$ and R$^3$ are each independently selected from hydrogen and substituted or unsubstituted monovalent hydrocarbon groups. The substituted or unsubstituted monovalent hydrocarbon groups are preferably those of 1 to 10 carbon atoms, more preferably 1 to 6 carbon atoms. Examples include alkyl groups such as methyl, ethyl, propyl and butyl, alkenyl groups such as vinyl and allyl, aryl groups such as phenyl and tolyl, cycloalkyl groups such as cyclohexyl, and substituted ones of the foregoing groups in which some or all of the hydrogen atoms attached to carbon atoms are substituted with halogen atoms. Inter alia, R$^2$ is preferably methyl and R$^3$ is preferably hydrogen.

Q is each independently selected from divalent organic groups. Preferred divalent organic groups are those of 2 to 5 carbon atoms, for example, alkylene groups such as —CH$_2$CH$_2$— and —(CH$_2$)$_3$— and ether groups containing an oxygen atom, such as —CH$_2$OCH$_2$CH$_2$—.

The subscript "a" is an integer of 1 to 3, especially 1 or 2, "b" is an integer of 0 to 2, especially 0 or 1, a+b is an integer of 1 to 3, especially 1 or 2, and "c" is an integer of 1 to 3, especially 1 or 2.

In the organosilazane copolymer composed of units of formulae (2) and (3), the units of formula (2) and the units of formula (3) are present in a ratio between 95/5 and 50/50, preferably between 90/10 and 60/40, as expressed by the molar ratio of units (2)/units (3). In the event where R$^4$ is a perfluoroalkyl group, if the molar ratio is too high, the release agent soon loses its release properties and the release properties themselves are poor. Too low a molar ratio leads to insufficient release properties.

The organosilazane polymer composed of units of formula (1) can be prepared, for example, by reacting an organohalosilane of the general formula (4):

$$(R^1Q)_a R^2{}_b SiX_{4-a-b} \quad (4)$$

wherein X is a halogen atom such as chlorine, bromine or iodine, R$^1$, R$^2$, Q, a and b are as defined above, with ammonia or primary amine of the formula: R$^3$NH$_2$ wherein R$^3$ is as defined above, in an organic solvent.

Examples of the organohalosilane of formula (4) are given below.

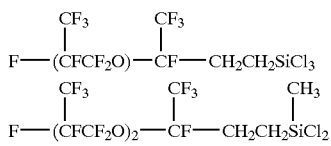

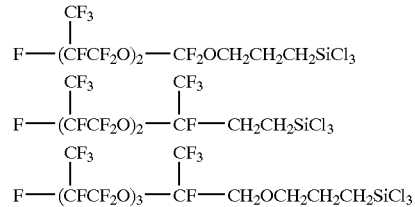

The organosilazane copolymer composed of units of formulae (2) and (3) can be prepared, for example, by reacting a mixture of an organohalosilane of the general formula (5):

$$(R^4Q)_a R^2{}_b SiX_{4-a-b} \quad (5)$$

wherein X, R$^4$, R$^2$, Q, a and b are as defined above and an organohalosilane of the general formula (6):

$$R^2{}_c SiX_{4-c} \quad (6)$$

wherein R$^2$, c and X are as defined above with ammonia or primary amine of the formula: R$^3$NH$_2$ wherein R$^3$ is as defined above, in an organic solvent.

Examples of the organohalosilane of formula (5) include, but are not limited to, those exemplified for formula (4) and those shown below.

C$_4$F$_9$CH$_2$CH$_2$SiCl$_3$,
C$_4$F$_9$CH$_2$Si(CH$_3$)Cl$_2$,
C$_4$F$_9$CH$_2$CH$_2$Si(CH$_3$)Cl$_2$,
C$_4$F$_9$CH$_2$OCH$_2$CH$_2$SiCl$_3$,
CF$_3$CH$_2$CH$_2$SiCl$_3$,
C$_2$F$_5$CH$_2$CH$_2$SiCl$_3$,
C$_3$F$_7$CH$_2$CH$_2$SiCl$_3$,
C$_8$F$_{17}$CH$_2$CH$_2$SiCl$_3$,
C$_8$F$_{17}$CH$_2$CH$_2$Si(CH$_3$)Cl$_2$,
C$_{10}$F$_{21}$CH$_2$CH$_2$SiCl$_3$,
C$_{10}$F$_{21}$CH$_2$CH$_2$Si(CH$_3$)Cl$_2$.

Examples of the organohalosilane of formula (6) include, but are not limited to, CH$_3$SiCl$_3$, (CH$_3$)$_2$SiCl$_2$, C$_6$H$_5$SiCl$_3$, and (C$_6$H$_5$)(CH$_3$)SiCl$_2$.

Any desired organic solvent may be used in the release agent of the invention as long as the organosilazane (co)polymer can be dissolved therein. Typical organic solvents are fluorinated hydrocarbons. Suitable fluorinated hydrocarbons include, but are not limited to, trichlorotrifluoroethane, tetrachlorodifluoroethane, dichloromonofluoroethane, dichlorotrifluoroethane, bromochlorotrifluoroethane, and m-xylene hexafluoride.

Other organic solvents may be used in combination with the fluorinated hydrocarbons as long as this does not adversely affect the solubility of the organosilazane (co)polymer. Such other organic solvents include chlorinated hydrocarbons such as dichloroethane, trichloroethane and methylene chloride, aromatic hydrocarbons such as benzene, toluene and xylene, ethers such as diethyl ether, dipropyl ether and dibutyl ether, and saturated hydrocarbons such as n-pentane, n-hexane, n-heptane, cyclohexane and petroleum ether.

The organic solvent may be used as a reaction medium when the organosilazane (co)polymer is synthesized or as a solvent or diluent to be added after the synthesis of the organosilazane (co)polymer.

In the release agent of the invention, the organic solvent is preferably used in such amounts that the organosilazane (co)polymer is present in a concentration of 0.1 to 50% by weight, especially 0.2 to 20% by weight of the agent.

In addition to the foregoing essential components, other additives may be admixed in the release agent of the invention as long as they do not compromise the objects of the invention.

The release agent of the invention may be prepared by mixing the organosilazane (co)polymer with the organic solvent capable of dissolving the polymer and optional additives in a conventional manner although the preparation method is not limited thereto.

Various resin compositions based on organic resins such as thermoplastic resins and thermosetting resins can be molded in metal molds whose cavity has been treated with the release agent of the invention. Especially when silicone base rubber compositions are molded, the release agent of the invention is advantageously used because it is effective in mold release and retention thereof and facilitates molding operation.

The preferred silicone base rubber compositions are heat-curable silicone base rubber compositions, which include heat-curable silicone rubbers in which the backbone of the matrix consists of an organopolysiloxane, silicone-polyolefin copolymer rubbers (co-vulcanization type) in which the backbone consists of a copolymerized structure of organopolysiloxane and polyolefin, and silicone-polyether copolymer rubbers (co-vulcanization type) in which the backbone consists of a copolymerized structure of organopolysiloxane and polyether. The release agent of the invention is more effective in mold release and retention thereof when applied to molds where the heat-curable silicone rubbers and silicone-polyolefin copolymer rubbers (co-vulcanization type) are molded.

Suitable heat-curable silicone rubber compositions which can be molded include addition cure type silicone rubber compositions comprising an alkenyl-containing organopolysiloxane as a main component, an organohydrogenpolysiloxane and a platinum base catalyst, and organic peroxide cure type silicone rubber compositions comprising an alkenyl-containing organopolysiloxane as a main component and an organic peroxide, with better results obtained with the former.

Adhesion promoters and other additives may be added to the heat-curable silicone base rubber compositions. The adhesion promoter, when added, is preferably used in an amount of at least 0.1% by weight, more preferably 0.2 to 5% by weight of the heat-curable silicone base rubber composition.

When silicone base rubber compositions are molded in molds to which the inventive release agent has been applied, any of molding techniques including injection molding, compression molding, casting and transfer molding may be used. The release agent of the invention is advantageously used in molds adapted for injection molding where molding cycles of high temperature and short time are repeated.

In applying the release agent of the invention to a metal mold, any of coating techniques including brush coating, coating using fabric or gauze, and spray coating may be employed. Once the release agent is applied to the mold, it is preferably dried at room temperature for about 5 minutes to 12 hours and baked at 50 to 200° C. for about 5 minutes to 5 hours. Then the mold is ready for molding.

For the molding of silicone base rubber articles, molding and curing conditions are not critical. Suitable well-known conditions may be used in accordance with the molding technique and the type of silicone base rubber.

EXAMPLE

Preparation Examples, Examples and Comparative Examples are given below for further illustrating the invention. Examples are not to be construed as limiting the invention thereto. In the following Examples, "pbw" shows "parts by weight".

Preparation of Release Agent

Preparation Example 1

Release Agent A

For the synthesis of an organosilazane polymer, a reactor was charged with 55.9 g ($6.8 \times 10^{-2}$ mol) of a fluorinated trichlorosilane of the formula:

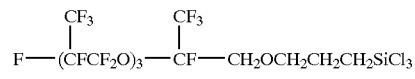

and 200 ml of trichlorotrifluoroethane. The solution was cooled at 5° C. and warmed up to 20° C., at which temperature ammonia gas was blown into the solution for 2 hours. The solution was then heated under reflux for 30 minutes for removing the excess ammonia which had been dissolved in the solution. The solution was cooled again at 5° C., after which the by-product ammonium chloride was removed from the solution by filtration, obtaining a colorless transparent organosilazane polymer. The organosilazane polymer was then diluted with trichlorotrifluoroethane to a concentration of 1% by weight, which was an end release agent A.

Preparation Example 2

Release Agent B

For the synthesis of an organosilazane copolymer, a reactor was charged with 60 g (0.10 mol) of a fluorinated trichlorosilane of the formula: $C_8F_{17}CH_2CH_2SiCl_3$, 4.0 g ($3.1 \times 10^{-2}$ mol) of dichlorodimethylsilane, 0.14 g ($1.0 \times 10^{-3}$ mol) of trichloromethylsilane, and 200 ml of trichlorotrifluoroethane. Through the same procedure as in Preparation Example 1, a release agent B was obtained.

Examples 1–2 and Comparative Example 1

A mold release test was carried out by using a metal mold treated with the release agent and injection molding a silicone base rubber composition (a) or (b) therein under predetermined conditions. The results are shown in Table 1.

Rubber Composition (a):

Two-part addition cure type liquid silicone rubber composition KE2000-50A/B by Shin-Etsu Chemical Co., Ltd.

Rubber Composition (b):

KE2000-50XA/XB (KE2000-50XA=KE2000-50A, KE2000-50XB=KE2000-50B 100 pbw+γ-glycidoxypropyltrimethoxysilane 1 pbw+adhesion promoter 1 pbw)

Adhesion Promoter

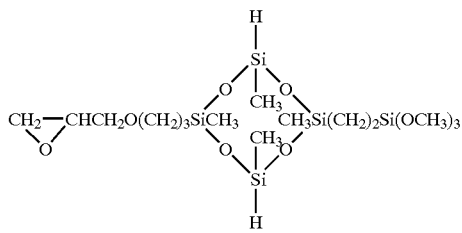

Injection Molding Machine:
  liquid silicone rubber injection molding machine (Arburg A.G.)
Mold:
  stainless steel mold with four nipple cavities (PRC K.K.), cold runner, air blowing removal
Test Conditions:
  injection pressure 1200 bar
  mold temperature setting 200° C.
  curing time 14 seconds
  molding cycle 24 seconds
Mold Treatment:
  Release agent A or B was brush coated to the mold cavity surface, dried at room temperature for one hour, and baked at 120° C. for one hour.
Evaluation:
  Injection molding was performed 1,000 shots. The number of shots where molded parts could not automatically removed because of sticking to the mold was counted.

TABLE 1

|  | Comparative Example 1 | Example 1 | Example 2 |
| --- | --- | --- | --- |
| Release agent | none | A | B |
| Molding material | Rubber composition (a) | | |
| Former 500 shots | 15/500 | 0/500 | 0/500 |
| Later 500 shots | 20/500 | 0/500 | 5/500 |
| Molding material | Rubber composition (b) | | |
| Former 500 shots | unremovable, stopped after 10 shots | 0/500 | 5/500 |
| Later 500 shots |  | 0/500 | 12/500 |

Examples 3–4 and Comparative Example 2

A mold release test was carried out by using a metal mold treated with the release agent and compression molding a SEP silicone rubber composition (c) (belonging to silicone-polyolefin copolymer co-vulcanization type silicone rubbers) therein under predetermined conditions. The results are shown in Table 2.
Rubber Composition (c):
  millable silicone-ethylene-propylene (SEP) copolymer type silicone rubber SEP-1721U (Shin-Etsu Chemical Co., Ltd.) 100 pbw+organic peroxide curing catalyst C-11 (Shin-Etsu Chemical Co., Ltd.) 2 pbw
Mold:
  stainless steel mold with 32 nipple cavities
Test Conditions:
  mold temperature setting 170° C.
  curing time 5 minutes
Mold Treatment:
  Release agent A or B was brush coated to the mold cavity surface, dried at room temperature for one hour, and baked at 120° C. for one hour.
Evaluation:
  Compression molding was performed 100 shots. The number of shots where molded parts could not smoothly removed because of rubber breakage or the like was counted.

TABLE 2

|  | Comparative Example 2 | Example 3 | Example 4 |
| --- | --- | --- | --- |
| Release agent | none | A | B |
| Molding material | Rubber composition (c) (SEP rubber) | | |
| Former 50 shots | unremovable, stopped after 5 shots | 12/50 | 25/50 |
| Later 50 shots |  | 28/50 | unremovable, stopped after 5 shots |

Comparative Examples 3–5

For an acrylic rubber composition, a mold release test was carried out by compression molding as done on the SEP rubber composition. The results are shown in Table 3.
Acrylic Rubber Composition:
  epoxy group-containing acrylic elastomer (NOXTITE PA312 by Nippon Mektron, Ltd.) 100 pbw+FEF carbon black 40 pbw+crosslinker (NOCCELER-PZ) 3 pbw
Mold:
  stainless steel mold with 32 nipple cavities
Test Conditions:
  mold temperature setting 160° C.
  curing time 10 minutes
Mold Treatment:
  Release agent A or B was brush coated to the mold cavity surface, dried at room temperature for one hour, and baked at 120° C. for one hour.
Evaluation:
  Compression molding was performed 100 shots. The number of shots where molded parts could not smoothly removed because of rubber breakage or the like was counted.

TABLE 3

|  | Comparative Example 3 | Comparative Example 4 | Comparative Example 5 |
| --- | --- | --- | --- |
| Release agent | none | A | B |
| Molding material | Acrylic rubber composition | | |
| Former 50 shots | unremovable, stopped after 5 shots | unremovable, stopped after 5 shots | unremovable, stopped after 5 shots |
| Later 50 shots |  |  |  |

In every run, removal of molded parts was impossible from the first shot, indicating that the release agent of the invention was ineffective when applied to the molding of acrylic rubber.

There has been described a release agent which exhibits effective, long-lasting release properties when applied to molds for silicone base rubber molding and facilitates molding operation.

Japanese Patent Application No. 2002-244656 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method of producing a silicone base rubber article, comprising the step of molding a silicone base rubber in a mold treated with the release agent comprising as essential components, an organosilazane polymer comprising units represented by the general unit formula (1):

$$(R^1Q)_a R^2_b Si(NR^3)_{(4-a-b)/2} \qquad (1)$$

wherein $R^1$ is independently a perfluoroalkyl ether group, $R^2$ and $R^3$ are each independently hydrogen or a substituted or unsubstituted monovalent hydrocarbon group, Q is independently a divalent organic group, "a" is an integer of 1 to 3, "b" is an integer of 0 to 2, and the sum of a+b is an integer of 1 to 3, and an organic solvent capable of dissolving the polymer.

2. The method of claim 1 wherein the silicone base rubber is a heat-curable silicone base rubber.

3. The method of claim 2 wherein the heat-curable silicone base rubber is an addition cure type silicone rubber.

4. The method of claim 2 wherein the heat-curable silicone base rubber is an organic peroxide cure type silicone rubber.

5. The method of claim 2 wherein the heat-curable silicone base rubber is a silicone-polyolefin copolymer rubber.

6. The method of claim 2 wherein the heat-curable silicone base rubber contains at least 0.1% by weight of an adhesion promoter.

7. A method of producing a silicone base rubber article, comprising the step of molding a silicone base rubber in a mold treated with a release agent comprising as essential components, an organosilazane copolymer comprising units represented by the general unit formula (2):

$$(R^4Q)_a R^2_b Si(NR^3)_{(4-a-b)/2} \qquad (2)$$

wherein $R^4$ is independently a perfluoroalkyl or perfluoroalkyl ether group, $R^2$ and $R^3$ are each independently hydrogen or a substituted or unsubstituted monovalent hydrocarbon group, Q is independently a divalent organic group, "a" in an integer of 1 to 3, "b" is an integer of 0 to 2, and the sum of a+b is an integer of 1 to 3, and units represented by the general unit formula (3):

$$R^2_c Si(NR^3)_{(4-c)/2} \qquad (3)$$

wherein $R^2$ and $R^3$ are as defined above, and "c" is an integer of 1 to 3, in a molar ratio of units (2)/units (3) between 95/5 and 50/50, and an organic solvent capable of dissolving the polymer.

8. The method of claim 7 wherein the silicone base rubber is a heat-curable silicone base rubber.

9. The method of claim 8 wherein the heat-curable silicone base rubber is an addition cure type silicone rubber.

10. The method of claim 8 wherein the heat-curable silicone base rubber is an organic peroxide cure type silicone rubber.

11. The method of claim 8 wherein the heat-curable silicone base rubber is a silicone-polyolefin copolymer rubber.

12. The method of any one of claims 8 to 11 wherein the heat-curable silicone base rubber contains at least 0.1% by weight of an adhesion promoter.

* * * * *